United States Patent [19]
Bennett

[11] Patent Number: 4,593,607
[45] Date of Patent: Jun. 10, 1986

[54] SPRING-PISTON COMBINATION FOR MANUALLY OPERATED PUMP

[75] Inventor: Robert A. Bennett, Easton, Conn.

[73] Assignee: Specialty Packaging Products, Inc., Richmond, Va.

[21] Appl. No.: 706,883

[22] Filed: Feb. 28, 1985

[51] Int. Cl.[4] .............................................. G01F 11/38
[52] U.S. Cl. .................................. 92/130 B; 222/340; 222/383; 222/473
[58] Field of Search .............. 92/130 B; 267/158, 159, 267/164; 222/340, 383, 473; 417/328; 292/336.3

[56] References Cited

U.S. PATENT DOCUMENTS 216,877 6/1879 McKenzie ........................ 92/130 B
637,798 11/1899 Johnson ............................ 92/130 B
646,380 3/1900 Bane .................................... 92/130 B
1,348,058 7/1920 Service .............................. 92/130 B
2,048,338 7/1936 Hume .................................. 267/158
2,406,746 9/1946 Davis ................................ 267/164

*Primary Examiner*—Robert E. Garrett
*Assistant Examiner*—Mark A. Williamson

[57] ABSTRACT

A manually operated actuator for a pump employs a vertical hollow chamber. A piston is vertically slidable in the chamber between a bottom position at which no pumping action can take place and a top position at which pumping action can occur. The piston and the chamber are contained in a housing. A trigger is pivotally secured in the housing and is connected to the piston. The trigger has a first position at which the piston is held in the bottom position and has a second position at which the piston is held in the top position. The trigger is normally in the first position and is manually movable into the second position. A spring device is disposed in the housing, being secured to the trigger and spaced from the chamber and piston. The device biases the trigger into the first position whenever there is no manual pressure on the trigger.

2 Claims, 4 Drawing Figures

FIG. 1
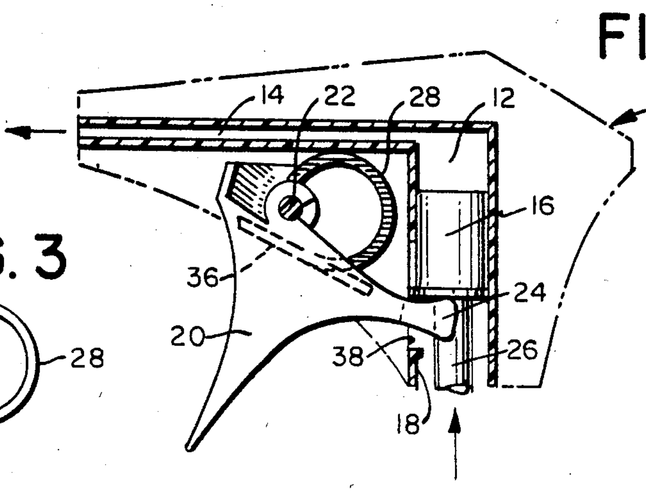
FIG. 3
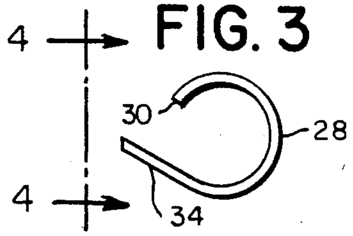
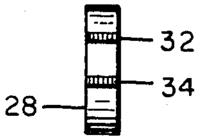
FIG. 4
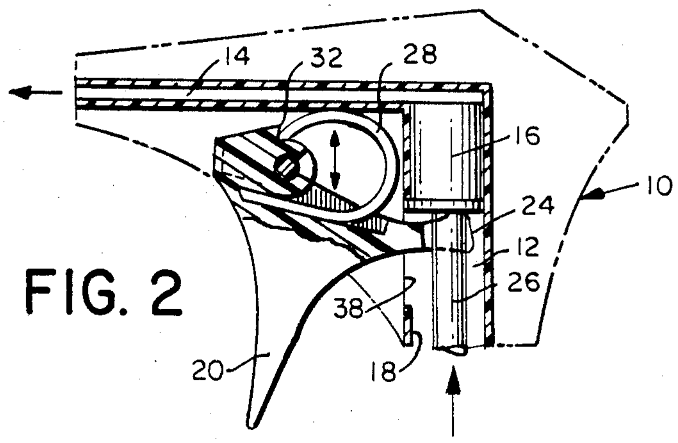
FIG. 2

SPRING-PISTON COMBINATION FOR MANUALLY OPERATED PUMP

BACKGROUND OF THE INVENTION

Manually operated small inexpensive pumps are used in dispensing various types of liquids such as detergents and the like. One well known type of pump employs a vertical hollow chamber with a piston vertically slidable therein between bottom and top positions. A trigger pivotally disposed in the pump is used to place the piston in either the normal bottom position or a temporary raised top position. A coil spring disposed in the chamber biases the piston in the bottom position. Pump action can only take place when the piston is in the top position and the liquid being pumped flows through the piston and spring. In order to avoid contamination of the liquid and corrosion of the spring, the spring must be formed from material which does not react chemically with the liquid. Typically the spring material is stainless steel. Consequently, the spring is relatively expensive.

The present invention is directed toward a new arrangement of spring and trigger which enables the biasing action to take place outside of the path of liquid flow whereby the expensive stainless steel coil spring is replaced by an inexpensive spring member of different geometry.

SUMMARY OF THE INVENTION

In accordance with the present invention, a manually operated pump has a housing containing a vertical hollow cylindrical chamber with a piston disposed therein. The piston is vertically slidable between a bottom position at which no pumping action can take place and a top position at which pumping action can occur with the pumped liquid flowing through the chamber. A trigger is pivotally secured in the housing and is connected to the piston. The trigger has a first position at which the piston is held in the bottom position and a second position at which the piston is held in the top position. The trigger is normally in the first position and is manually moveable into the second position. Spring means is disposed in the housing, being secured to the trigger and spaced from the chamber and piston. This means biases the trigger into the first position whenever there is no manual pressure on the trigger. As a result, the means is disposed outside of the path of the flow of liquid, enabling the use of an inexpensive spring arrangement using an inexpensive material.

BRIEF DESCRIPTION OF THE DRAWING

FIG. 1 is a partially cut away view of a pump incorporating the invention as shown in position at which pumping action cannot occur.

FIG. 2 is a view similar to FIG. 1 but showing the pump in position for pumping liquid.

FIG. 3 is a side view of a spring used in the structure shown in FIGS. 1 and 2.

FIG. 4 is a view taken along line 4—4 in FIG. 3.

DETAILED DESCRIPTION OF PREFERRED EMBODIMENT

Referring now to FIGS. 1–4, a plastic pump housing 10 has a vertical hollow cylindrical chamber 12 with a top horizontal hollow bar or conduit 14 through which liquid is pumped through for discharge. A vertical hollow piston 16 is vertically slidable in the chamber between a normal bottom rest position at which the piston rests on stop 18 in the chamber and a temporary raised position at which the top of the piston communicates with the conduit 14. The top of the piston is open and the bottom of the piston is secured in a leakproof manner to the top of a liquid feed tube 26. When the piston is in the bottom position, liquid will not pass through the piston to the conduit 14 whereby pumping action cannot take place. When the piston is in its raised top position, pumping action ensues. A trigger 20, formed in the same manner as the housing, piston and feed tube of plastic, is secured pivotally within the housing by transversely disposed horizontal pivot bar 22. The trigger has an extension 24 which engages the bottom end of the piston adjacent the tube 26. The engagement may be accomplished by permanently securing the extension to the piston or alternatively the positions of trigger and piston can be such that these elements are separate but always engage each other and hence are secured together. A spring member 28 having the general shape of a C is disposed in a vertical plane with an upper end 30 engaging a transverse horizontal slot 32 in the trigger adjacent the pivot bar and a lower end 34 having a straight extension disposed in a straight groove 36 disposed in the trigger adjacent but below the pivot bar. The member 28 has an upper curved portion adjacent end 30 bearing against the bottom of the conduit. The member applies pressure spring biasing the trigger into a first normal or rest position at which the piston is disposed in its bottom position. It will be seen that the extension 24 extends through a vertical slot 38 in the chamber to engage the piston. The trigger can be pivoted manually by conventional trigger action into a second position at which the piston is raised and pumping action ensues. The biasing action of member 28 will return the trigger and piston to rest and bottom positions respectively once the manual pressure on the trigger is removed.

The member 28 can be formed from any spring material, metal or plastic and can be formed intergral with or separate from the trigger. A particularly useful material for member 28 is the plastic known by the trade name DELARIN.

What is claimed is:

1. A manually operated actuation for a pump comprising:

a hollow cylindrical chamber disposed vertically;

a piston vertically slidable in the chamber between a bottom position at which no pumping action can take place and a top position at which pumping action can occur;

a housing in which the chamber and the piston are disposed, said housing containing a horizontal bar;

a trigger pivotally secured in the housing and connected to the piston, the trigger having a first position at which the piston is held in its bottom position and having a second position at which the piston is held in the top position, the trigger being normally in the first position and being manually movable into the second position; and spring means constituted by a single incomplete loop having the general shape of a C, the spring means being disposed in the housing and secured to the trigger, both ends of the loop engaging the trigger, a portion of the loop intermediate the ends bearing against the bar, the spring means being spaced from the chamber and piston and biasing the trigger into the first position whenever there is no manual pressure on the trigger.

2. The actuator of claim 1 wherein the loop lies in a vertical plane with one end disposed above the other, the upper end being secured to the trigger adjacent the point of pivot, the lower end being disposed in a groove in the trigger which is disposed below the point of pivot.

* * * * *